(12) United States Patent
Knowles

(10) Patent No.: US 7,096,685 B2
(45) Date of Patent: Aug. 29, 2006

(54) COUPLING FOR SERVICING A PRESSURIZED SYSTEM

(75) Inventor: Steven M. Knowles, Silver Lake, IN (US)

(73) Assignee: Prime Solutions LLC, Troy, MI (US)

( * ) Notice: Subject to any disclaimer, the term of this patent is extended or adjusted under 35 U.S.C. 154(b) by 0 days.

(21) Appl. No.: 11/024,486

(22) Filed: Dec. 30, 2004

(65) Prior Publication Data

US 2005/0115610 A1    Jun. 2, 2005

Related U.S. Application Data

(63) Continuation of application No. 10/326,292, filed on Dec. 23, 2002, now Pat. No. 6,837,064.

(60) Provisional application No. 60/343,181, filed on Dec. 31, 2001.

(51) Int. Cl.
*F25B 45/00* (2006.01)

(52) U.S. Cl. .......................... 62/292; 62/299

(58) Field of Classification Search .................. 62/299, 62/292, 149, 77, 251, 137; 251/149.6; 137/614.06
See application file for complete search history.

(56) References Cited

U.S. PATENT DOCUMENTS

| | | | |
|---|---|---|---|
| 2,464,563 A | 3/1949 | Doeg | |
| 3,424,181 A | 1/1969 | Morse | |
| 3,592,439 A | 7/1971 | Ritchie, Jr. | |
| 3,777,771 A | 12/1973 | De Visscher | |
| 4,008,716 A | 2/1977 | Amlong | |
| 4,017,057 A | 4/1977 | Strybel | |
| 4,182,370 A | 1/1980 | Karcher | |
| 4,261,178 A | 4/1981 | Cain | |
| 4,328,948 A | 5/1982 | Pearl, II | |
| 4,338,793 A | 7/1982 | O'Hern | |
| 4,449,545 A | 5/1984 | Vernor et al. | |
| 5,005,369 A | 4/1991 | Manz | |
| 5,005,375 A | 4/1991 | Manz et al. | |
| 5,063,749 A | 11/1991 | Manz | |
| 5,080,132 A | 1/1992 | Manz et al. | |
| 5,139,049 A | 8/1992 | Jensen et al. | |
| 5,148,839 A | 9/1992 | Kirwan et al. | |
| 5,169,192 A | 12/1992 | Allison et al. | |
| 5,181,391 A | 1/1993 | Manz | |
| 5,193,351 A | 3/1993 | Laukhuf et al. | |
| 5,244,010 A | 9/1993 | Barjasteh et al. | |
| 5,261,249 A | 11/1993 | Manz et al. | |
| 5,285,647 A | 2/1994 | Manz et al. | |
| 5,289,850 A | 3/1994 | Sarson et al. | |
| 5,293,902 A | 3/1994 | Lapierie | |
| 5,312,084 A | 5/1994 | Weh | |
| 5,367,886 A | 11/1994 | Manz et al. | |

(Continued)

FOREIGN PATENT DOCUMENTS

DE    695491    7/1940

(Continued)

OTHER PUBLICATIONS

"R134a Couplers, Replacement Gauges, Gauge Protectors," Mastercool brochure, undated.

*Primary Examiner*—Melvin Jones
(74) *Attorney, Agent, or Firm*—Steptoe & Johnson LLP

(57) ABSTRACT

A service device connects to a service port of a pressurized system. The device includes a valve opening member for opening a valve within the port. The device can attach to a service unit for servicing the pressurized system. The system can be an air conditioning or refrigeration system.

16 Claims, 5 Drawing Sheets

U.S. PATENT DOCUMENTS

| | | | |
|---|---|---|---|
| 5,370,359 A | 12/1994 | Sadegh et al. | |
| 5,370,527 A | 12/1994 | Hefling et al. | |
| 5,388,416 A | 2/1995 | Manz et al. | |
| 5,388,634 A | 2/1995 | Weinstein et al. | |
| 5,415,200 A | 5/1995 | Haunhorst et al. | |
| 5,450,875 A | 9/1995 | Chichester et al. | |
| 5,586,748 A * | 12/1996 | Kish | 251/149.8 |
| 5,725,025 A | 3/1998 | Park et al. | |
| 5,975,490 A | 11/1999 | Essman | |
| 6,041,818 A | 3/2000 | Schadewald et al. | |
| 6,170,541 B1 * | 1/2001 | Sanhaji | 141/98 |
| 6,230,737 B1 | 5/2001 | Notaro et al. | |
| 6,266,971 B1 | 7/2001 | Schroder et al. | |
| 6,269,840 B1 | 8/2001 | Beaver | |
| 6,273,397 B1 * | 8/2001 | Schultz et al. | 251/149.6 |
| 6,298,886 B1 | 10/2001 | Robinson et al. | |
| 6,637,460 B1 | 10/2003 | Haunhorst | |
| 6,837,064 B1 * | 1/2005 | Knowles | 62/292 |
| 6,848,670 B1 * | 2/2005 | Haunhorst et al. | 251/149.6 |

FOREIGN PATENT DOCUMENTS

| | | |
|---|---|---|
| DE | 2313188 | 9/1974 |
| FR | 377682 | 7/1907 |
| GB | 449261 | 6/1936 |

* cited by examiner

COUPLING FOR SERVICING A PRESSURIZED SYSTEM

CLAIM OF PRIORITY

This application is a continuation of U.S. application Ser. No. 10/326,292, filed Dec. 23, 2002 now U.S. Pat. No. 6,837,064, which claims priority to U.S. patent application Ser. No. No. 60/343,181 filed on Dec. 31, 2001, each of which is incorporated by reference in its entirety.

TECHNICAL FIELD

This invention relates to a coupling for servicing a pressurized system.

BACKGROUND

Servicing couplings are commonly employed to facilitate charging and evacuation of pressurized fluid systems, such as refrigeration systems, air conditioning systems, or hydraulic systems. The service coupling connects to a service port of the system. The service coupling opens a service port of a system, allowing fluids, including liquids or gases, to be exchanged with the system. A quick-release interconnection between the service port and the service adapter can facilitate the servicing process. For example, when servicing a refrigeration or air conditioning system the service coupling can be connected by a flexible hose to a refrigerant supply source, such as a pressurized bottle or cylinder. When the service coupling and service port is opened, refrigerant can flow through the coupling and into the refrigeration system. Because pressurized fluid systems can be serviced when the system is installed in a confined space such as a vehicle, service couplings having small dimensions can be useful for convenient servicing.

SUMMARY

In one aspect, a service device includes a body having a first end engagable with a service port, a second end engagable with a service unit, and an inner surface defining an interior chamber. The device includes a valve opening member disposed in the interior chamber, and a service port opening member configured to rotate the valve opening member relative to the body, the first end and the second end being in fluid communication when a service port is engaged with the first end and the service port is opened.

The valve opening member can include a plug engaging end proximate to the first end, the plug engaging end being capable of changing position relative to the first end.

The device can also include a spring within the body, biasing the valve opening member toward the first end, and a sealing gasket between the body and the first end. The first end can be capable of forming a seal with the port when the first end is engaged with the service port. The plug engaging end can have a cross section having a substantially hexagonal shape. The body can be a portion of a coupling device. The first end can be engagable with a refrigerant port.

The device can include a valve member within the body having a first position oriented closer to the first end relative to a second position, the valve member moving from the first position to the second position when the service port is engaged with the first end of the body and the service port is opened. The first end can be in fluid communication with the second end when the valve member is in the second position. The valve member can be slideably disposed on a surface of the service port opening member.

The device can be a coupling member. An air conditioning or refrigeration service device can include a service unit including the coupling member.

In another aspect, a method of opening a service port includes adjusting a position of a valve opening member relative to a first end of a service port connector, and opening a valve within the service port. The valve opening member can include a plug engaging end proximate to the first end. The service port connector can be attached to a service unit or can be capable of attaching to a service unit and the first end can be engagable with the service port. The valve opening member can rotate relative to the body to open the valve. Adjusting can take place upon attaching the service port connector to the service port. The method can also include sealing the connector to the port prior to opening the valve. Opening the valve can actuate a valve member within the connector to bring a first end of the connector and a second end of the connector into fluid communication.

The details of one or more embodiments are set forth in the accompanying drawings and the description below. Other features, objects, and advantages will be apparent from the description and drawings, and from the claims.

DETAILED DESCRIPTION

Figure 1:
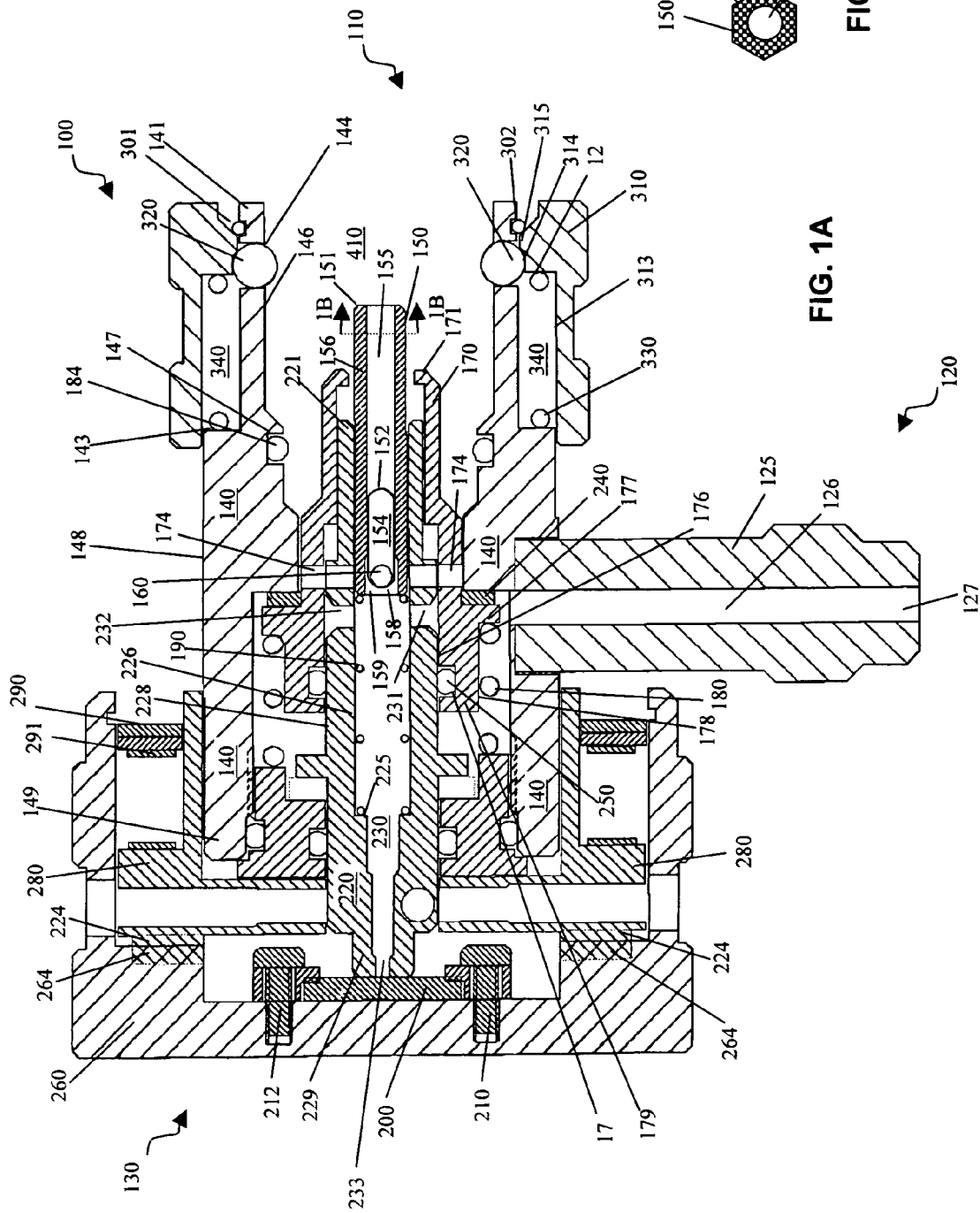
FIG. 1A is a sectional view of a service coupling.
FIG. 1B is a sectional view of an engagement member of the service coupling along the line 1B—1B of FIG. 1A.

Referring to FIG. 1A, a service coupling 100 includes a mating portion 110 for coupling to a service port, a port 120, and a flow path control portion 130 that allows an operator to control a fluid flow path between mating portion 110 and port 120.

Port 120 can be attached to service equipment to connect the equipment to the service port. For example, the service port can be a service port of an automotive air conditioning system and the service equipment can include any sort of maintenance or repair system, such as a diagnostic tester, fluorescent leak detection system (i.e., dyes, injection system, lights), electronic leak detection system, recovery and recycling machine radiator service device, refrigerant identification tester, a flushing system, an oil insertion system, or a manifold gauge set.

Service coupling 100 is formed by a main body member 140, a flow path control portion 130, a knob 260, and a port nozzle 125.

Main body member 140 is generally tubular in shape and has an outer surface 148, an inner surface 146, a first end 141, and a second end 149 opposite first end 141. End 141 of main body member 140 defines hole 144 dimensioned to receive ball bearing 320. Ball bearing 320 is retained in hole 144 by an annular ring 310 which surrounds a portion of outer surface 148. Ball bearing 320 is arranged to engage a service port when inserted into mating portion 110.

Annular ring 310 includes an inner face 313 with an interior annular lip 314 having a raised portion 315. Interior annular lip 314 has a lip wall 12. Inner face 313 and outer surface 148 of main body member 140, along with lip wall 12 and a lateral wall 143 on outer surface 148 of main body member 140, together define an annular volume 340 which houses a spring 330. Spring 330 biases lip wall 12 away from lateral wall 143 so that annular ring 310 contacts retaining ring 302 and is compressible toward lateral wall 143 to allow ball bearings 320 to project into notch 301 from channels 144 thereby releasing a service port received in mating portion 110.

Inner surface 146 at end 141 of main body member 140 defines a chamber 410 for receiving a service port into mating portion 110. Inner surface 146 also defines an annular groove 147 around chamber 410 for receiving a sealing member 184 which seals to a service port when received in mating portion 110. In addition to inner surface 146, chamber 410 is bounded by a central body member 220 and a valve member 170.

Central body member 220 is also generally tubular in shape and has an outer surface 228, an inner surface 226, a first end 221, and a second end 229 opposite first end 221. Central body member 220 defines a volume 230 and channels 231, 232 that communicate between outer surface 228 and inner surface 226. Central body member 220 also includes a lateral wall 225 that extends inner surface 226 into axial volume 230. Orifice 233 located at end 229 extends from volume 230 to outer surface 228.

Axial volume 230 contains an elongate engagement member 150 that extends into chamber 410. Engagement member 150 has a first end 151, a second end 159 opposite first end 151, and a wall 156 including a pair of opposing lateral slots 154 (only one is shown) and an axial channel 155 extending from first end 151 to second end 159. Lateral slots 154 have a first end 152 and a second end 158. Pin 160 is contained between first end 152 and second end 158 in slots 154, and traverses laterally through engagement member 150. Pin 160 is mechanically joined to central body member 220. Engagement member 150 is slidable along pin 160, allowing relative axial movement between member 220 and engagement member 150 over the span between first end 152 and second end 158. Pin 160 can also transmit torque from handle 260, through member 220 to engagement member 150. Spring 190 is contained in axial volume 230 between lateral wall 225 of central body member 220 and end 159 of engagement member 150, biasing engagement member 150 toward mating portion 110. Spring 190 allows engagement member 150 to be driven into axial volume 230 during insertion of a service port into chamber 410 if engagement member 150 is not aligned properly with the service port, as discussed further below in regard to FIG. 2.

Annular valve member 170 is also generally tubular in shape and has an outer surface 178, an inner surface 176, a first end 171, and a second end 179 opposite first end 171. Inner surface 176 defines an annular groove 17 for receiving a sealing member 250 to seal valve member 170 to outer surface 228 of central member 220. Annular valve member 170 defines channels 174 which span between outer surface 178 and inner surface 176. Fixed seal 240 is attached to surface 146 and forms a releasable seal between surface 146 and surface 178. Annular valve member 170 also includes an outwardly extending lip 177 contacting a spring 180 circumscribing outer surface 178 of annular valve member 170 and outer surface 228 of central member 220 but within inner surface 146 of main body member 140. Spring 180 biases annular valve member 170 to form the seal between surface 178 and surface 146. Annular valve member 170 is slidable along outer surface 228 of central member 220. When member 170 slides away from the mating region 110, for example, when coupled to a service port as described below, the releasable seal formed between fixed seal 240 and inner surface 146 to form a fluid flow path from chamber 410 through channels 174 to channel 126 of port nozzle 125, which, in turn, is in fluid communication with orifice 127 of port nozzle 125.

Flow path control portion 130 includes knob 260, which as describe above, applies torque to engagement member 150 by rotating inner knob 280. Inner knob 280 is fixed to central body member 220. Outer ratchet teeth 264 of knob 260 contact and mate with inner ratchet teeth 224 of inner knob 280. Gasket 200 is located between knob 260 and knob 280 over orifice 233. Gasket 200 is secured to knob 260 by fastener 210 and fastener 212. Spring 291, which is located between inner knob 260 and holding plate 290, biases knob 260 toward mating portion 110. This bias holds ratchet teeth 264 in contact with ratchet teeth 224. Biasing of knob 260 toward mating portion 110 by spring 291 also forms a seal between gasket 200 and orifice 233.

When knob 260 is rotated in a direction that opens an engaged service port (for example, a counter-clockwise direction when knob 260 is viewed from above), a surface of ratchet teeth 264 presses against a surface of ratchet teeth 224 in an orientation parallel to the axis of rotation. This configuration allows all torque applied to knob 260 to be applied to member 150 when opening the service port because no slipping occurs between knob 260 and inner knob 280. When knob 260 is rotated in a direction that closes an engaged service port (for example, a clockwise direction when knob 260 is viewed from above), a surface of ratchet teeth 264 presses against a surface of ratchet teeth 224 in an orientation that is not parallel to the axis of rotation. This configuration allows slippage to occur when the torque applied to knob 260 overcomes friction between the surface of ratchet teeth 264 and ratchet teeth 224 when closing the service port, thereby avoiding application of a potentially damaging force to the service port. The friction can be influenced by spring 291. When slippage occurs, knob 260 moves away from member 220, allowing the seal between gasket 200 and orifice 233 to break during the slippage.

Referring to FIG. 1B, wall 156 of engagement member 150 forms a hexagonal cross-section circumscribing axial channel 155 for engaging and rotating a service port received in mating portion 110.

Figure 2:
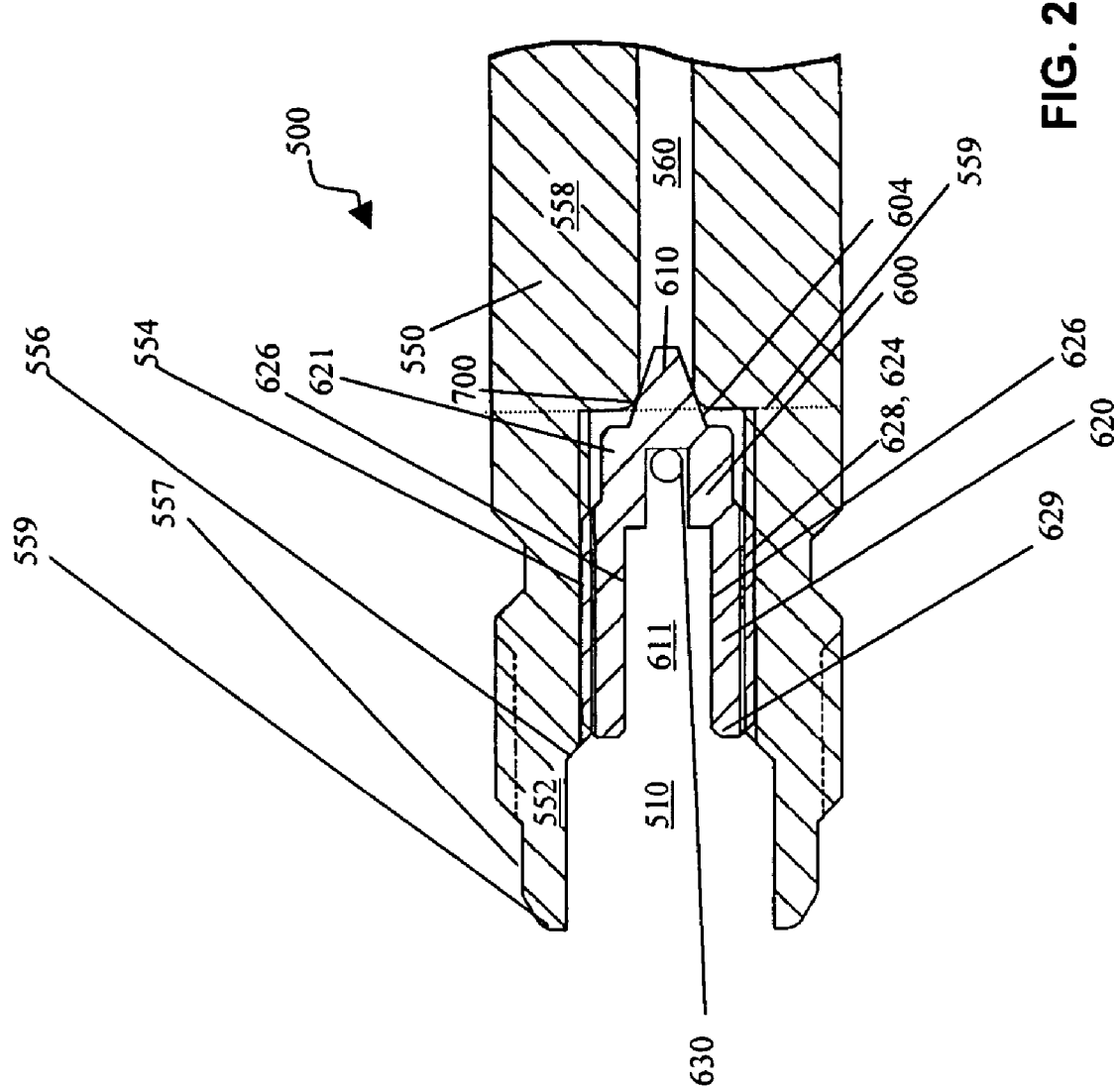
FIG. 2 is a sectional view of a service port.

Referring to FIG. 2, a service port 500 includes a body 550 and a plug 600. Body 550 includes a conduit portion 558 for conducting fluid and a mating portion 552 for connecting to service coupling 100. Conduit portion 558 includes a wall 556 defining a fluid channel 560. Mating portion 552 is generally tubular and has an end 559, an outer surface 557, and an inner surface 556. Mating portion 552 is joined to conduit portion 558. Outer surface 557 can form a seal with sealing member 184 of coupling 100, as discussed further below. Inner surface 556 defines a chamber 510 and includes a threaded portion 554. When port 500 is assembled, chamber 510 receives plug 600. Plug 600 is generally tubular in shape and includes a wall 620 with a first end 621, a second end 629, an outer surface 628, and an inner surface 626. End 621 of plug 600 is capped by a conical tip portion 610. Tip portion 610 includes an outer sloped surface 604 extending away from end 621. Outer surface 628 of wall 620 has a thread 624 are dimensioned to threadedly mate with threaded portion 554 of inner surface 556 of body 550. End 621 includes orifice 630 penetrating wall plug 600. In a closed position (as shown), tip portion 610 extends into fluid channel 560 and sloped surface 604 of tip portion 610 seals with wall 556 of fluid channel 560 at contact region 700. Inner surface 626 defines cavity 611, which can be hexagonal in cross-section and dimensioned to snugly receive engagement member 150 so that rotation of engagement member 150 can impart a rotational force to sealing member 600 and move sealing member 600 along threads 555 to open and close service port 500. In the closed position, radial seal 700 prevents fluid communication between fluid channel 560 and chamber 510. In an open position (not shown), contact in region 700 is broken bringing chamber 510 and channel 560 into fluid communication through orifice 630.

Figure 3:
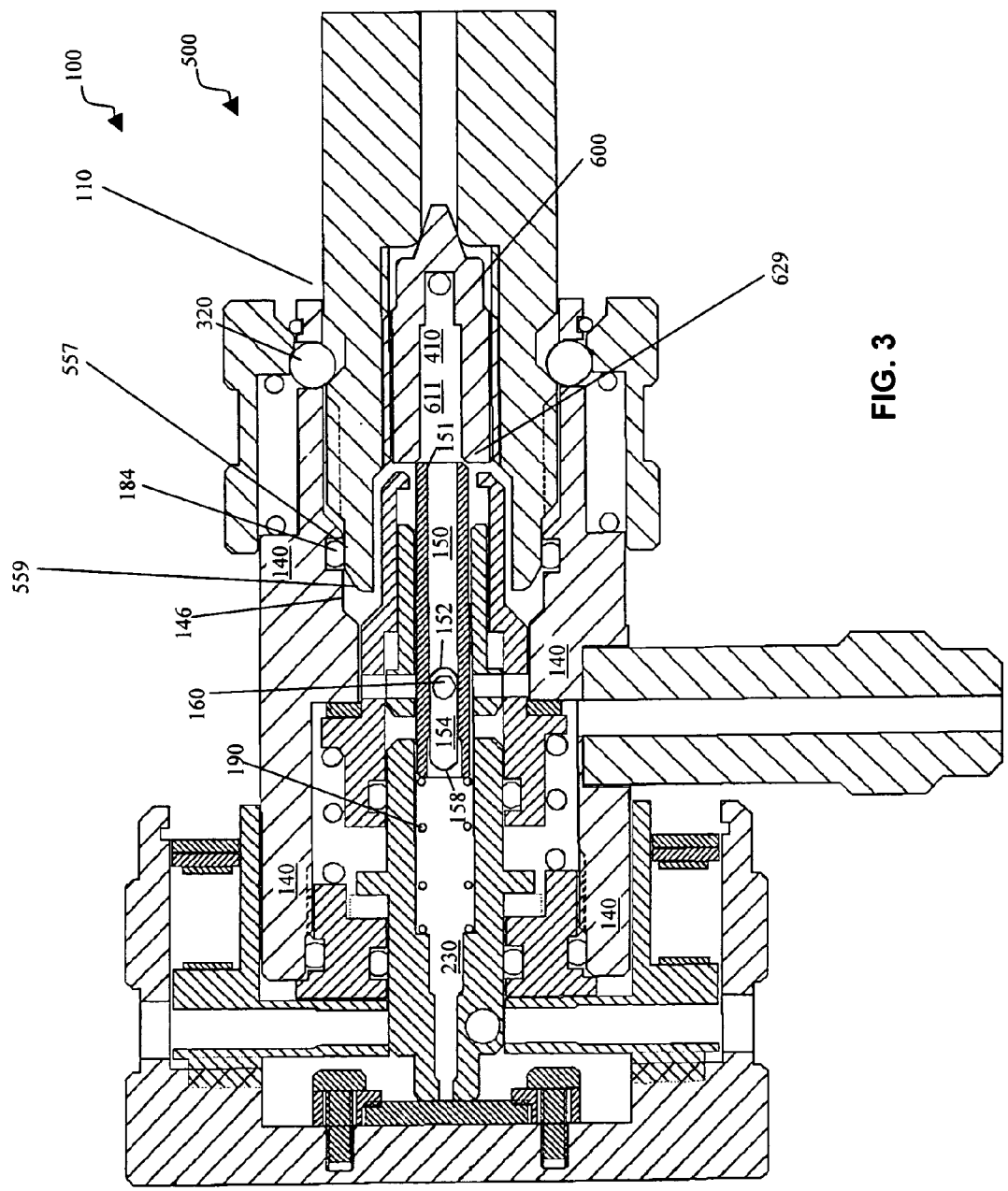
FIG. 3 is a sectional view of the service coupling connecting to a service port.

Referring to FIG. 3, in use, an operator inserts end 559 of service port 500 into mating portion 110 and chamber 410 of service coupling 100. Sealing member 184 seals outer surface 557 of service port 500 to inner surface 146 of main body member 140. Ball 320 engages with outer surface 557, holding port 500 in coupling 100. Cavity 611 is dimensioned to receive engagement member 150, each of which can have a hexagonal cross section. However, at the time of insertion, the cavity 611 of plug 600 may not be properly oriented to receive engagement member 150, in which case end 151 of engagement member 150 catches on end 629 of plug 600. As a result, end 629 forces engagement member 150 into volume 230, compressing spring 190. Slots 154 accommodate the inward movement of engagement member 150 as member 150 slides along pin 160 from first end 152 to second end 158. The movement of member 150 allows coupling 100 to mate with port 500 without damaging the coupling or the port.

Figure 4:
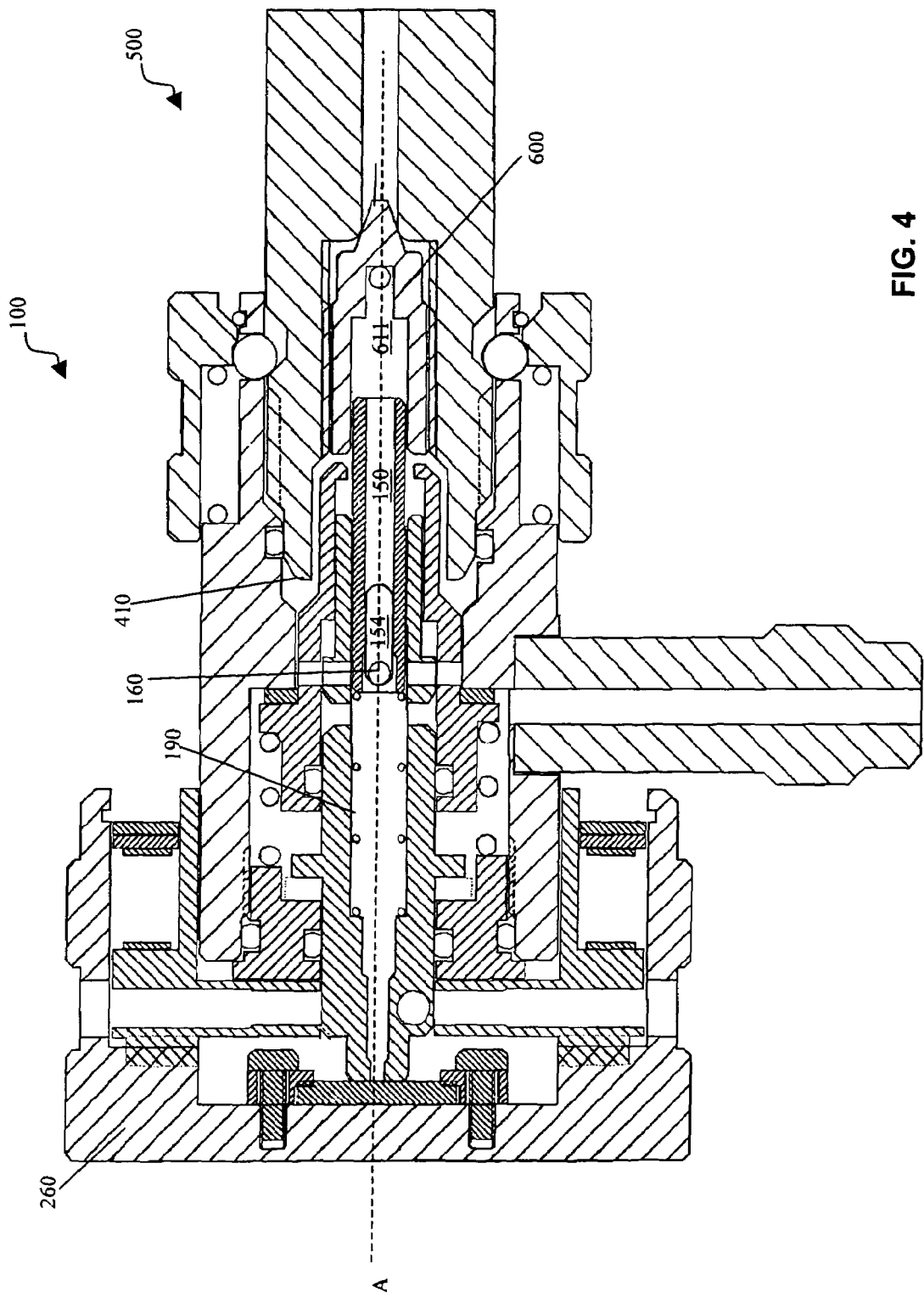
FIG. 4 is a sectional view of the service coupling connected to the service port.

Referring to FIG. 4, with service port 500 in chamber 410 of service coupling 100, the operator manually commences rotating knob 260. Knob 260 is mechanically joined to pin 160, which also commences rotation about axis A. The rotation of pin 160 in turn rotates engagement member 150 to align the cross-sectional pattern of member 150 with the cross-sectional pattern of cavity 611. When the cross-sectional patter of member 150 is aligned with the cross-sectional pattern of cavity 611, spring 190 slides member 150 along slot 154 and pin 160 and into cavity 611 to engage plug 600, thereby coupling plug 600 and knob 260 for combined rotation.

Figure 5:
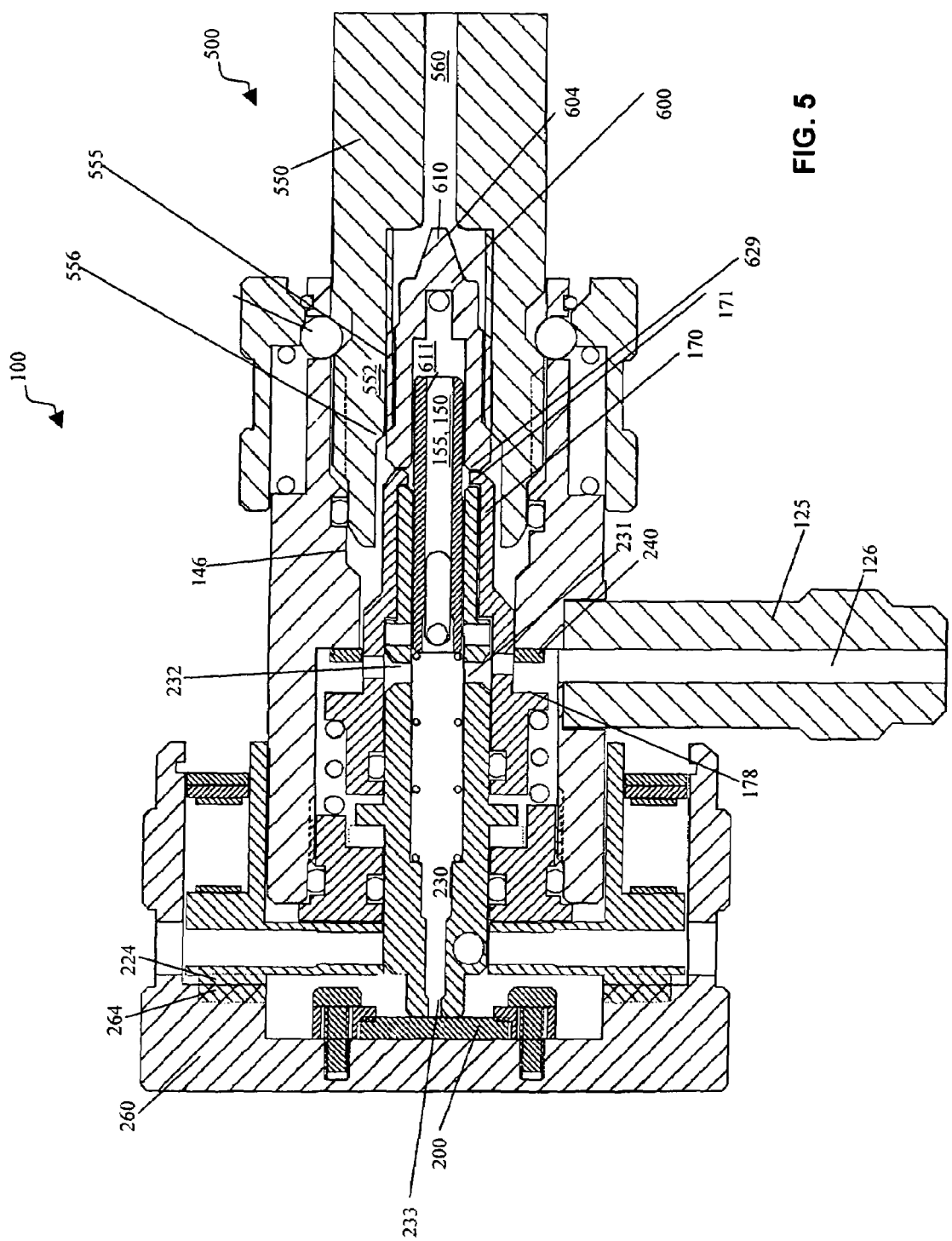
FIG. 5 is a sectional view of the service coupling opening the service port.

Referring to FIG. 5, once member 150 is engaged with plug 600, as described above, rotation of plug 600 using knob 260 moves plug 600 along threads 555 of service port body 550, separating sloped surface 604 from wall 556 and opening service port 500. As plug 600 is rotated, engagement member 150 extends progressively deeper into cavity 611 and tip 610 progressively withdraws from fluid channel 560 to place fluid channel 560 in communication with the fluid path formed by channel 155 and volume 230. As plug 600 moves along member 150, end 629 of plug 600 contacts end 171 of valve member 170 and slides valve member 170 toward knob 260 along central member 220. As member 170 slides toward knob 260, the seal between surface 178 and surface 146 at fixed seal 240 breaks, allowing volume 230 and channel 126 to fluidly communicate via channels 231, 232. Valve member 170 detects the presence plug 600 and the opening of the service port and moves toward knob 260 to form an uninterrupted fluid flow path from fluid channel 560, through channel 155 and volume 230 to channel 126 in port nozzle 125. With this arrangement, the operator will not be able to break the seal at a fixed seal 240 until service port 500 is received in chamber 410 of service coupling 100 and service port 500 has been broken when the port is opened. As described above, when knob 260 is rotated in a direction that closes an engaged service port, a surface of ratchet teeth 264 presses against a surface of ratchet teeth 224 in an orientation that is not parallel to the axis of rotation, allowing slippage to occur and causing the seal between gasket 200 and orifice 233 to break during the slippage. The slippage occurs when plug 600 has been rotated to the closed position. The breaking of the seal between gasket 200 and orifice 233 that occurs once plug 600 has been rotated to the closed position allows pressure within the coupling to be equalized with the ambient environment.

A number of embodiments have been described. Nevertheless, it will be understood that various modifications may be made without departing from the spirit and scope of the invention. Accordingly, other embodiments are within the scope of the following claims.

What is claimed is:

1. A service device comprising:
   a body having a first end engagable with a service port, a second end engagable with a service unit, and an inner surface defining an interior chamber:
   a valve opening member disposed in the interior chamber, the valve opening member including a plug engaging end proximate to the first end, the plug engaging end being capable of changing position relative to the first end;
   a service port opening member configured to rotate the valve opening member relative to the body, the first end and the second end being in fluid communication when a service port is engaged with the first end and the service port is opened; and
   a member within the body having a first position oriented closer to the first end relative to a second position, the member moving from the first position to the second position when the service port is engaged with the first end of the body and permitting the service port to be opened.

2. The service device of claim 1, further comprising a spring within the body biasing the valve opening member toward the first end.

3. The service device of claim 1, further comprising a sealing gasket between the body and the first end, the first end being capable of forming a seal with the port when the first end is engaged with the service port.

4. The service device of claim 1, wherein the plug engaging end has a cross section having a substantially hexagonal shape.

5. The service device of claim 1, wherein the body is a portion of a coupling device.

6. The service device of claim 1, wherein the first end is engagable with a refrigerant port.

7. The service device of claim 1, wherein the member is slideably disposed on a surface of the service port opening member.

8. A coupling member comprising:
   a body having a first end engagable with a service port, a second end engagable with a service unit, and an inner surface defining an interior chamber;
   a valve opening member disposed in the interior chamber;
   a valve member within the body having a first position oriented closer to the first end relative to a second position;
   a service port opening member configured to rotate the valve opening member relative to the body, the valve member moving from the first position to the second position and the first end and second end being in fluid communication when the service port is engaged with the first end of the body and the service port is opened; and a sealing gasket between the body and the first end, the first end being capable of forming a seal with the port when the first end is engaged with the service port.

9. The coupling member of claim 8, wherein the valve opening member including a plug engaging end proximate to the first end, the plug engaging end being capable of changing position relative to the first end.

10. The coupling member of claim 9, further comprising a spring within the body biasing the valve opening member toward the first end.

11. The coupling member of claim 8, wherein the plug engaging end has a cross section having a substantially hexagonal shape.

12. The coupling member of claim 8, wherein the first end is engagable with a refrigerant port.

13. The coupling member of claim 8, wherein the valve member is slideably disposed on a surface of the service port opening member.

14. A method of opening a service port comprising:

adjusting a position of a valve opening member relative to a first end of a service port connector, the valve opening member including a plug engaging end proximate to the first end, the service port connector being attached to a service unit or being capable of attaching to a service unit and the first end being engagable with the service port;

sealing the connector to the port; and opening a valve within the service port after sealing the connector to the port, wherein the valve opening member rotates relative to a body to open the valve.

15. The method of claim 14, wherein adjusting takes place upon attaching the service port connector to the service port.

16. The method of claim 14, wherein opening the valve actuates a valve member within the connector to bring a first end of the connector and a second end of the connector into fluid communication.

* * * * *